United States Patent [19]

Graham

[11] 4,407,548
[45] Oct. 4, 1983

[54] AIR SERVICE BRAKE EXHAUST CONTROL SYSTEM

[76] Inventor: John M. Graham, 921 Sequoia Ave., Millbrae, Calif. 94030

[21] Appl. No.: 320,892

[22] Filed: Nov. 16, 1981

Related U.S. Application Data

[63] Continuation-in-part of Ser. No. 152,590, May 23, 1980, abandoned.

[51] Int. Cl.³ .......................................... B60T 13/22
[52] U.S. Cl. .................................. 303/6 M; 303/9; 303/13; 303/68; 303/71; 137/522; 251/61.4
[58] Field of Search ................ 303/9, 6 M, 71, 13, 303/28–30, 40, 68, 69, 63, 89, 14, 70, 72–83, 6 R, 6 A, 84 R, 84 A, 50–56; 188/151 A, 170, 106 A, 106 P; 137/508, 522, 538, 494, 495; 251/61.3, 61.4, 63.6, 63.5, 63

[56] References Cited

U.S. PATENT DOCUMENTS

| | | | |
|---|---|---|---|
| 3,285,672 | 11/1966 | Avrea | 303/71 X |
| 3,294,455 | 12/1966 | Valentine | 303/13 X |
| 3,443,839 | 5/1969 | Hinrichs et al. | 303/9 X |
| 3,713,702 | 1/1973 | Campanini | 303/9 |
| 4,003,605 | 1/1977 | Fannin | 303/71 X |
| 4,057,297 | 11/1977 | Beck et al. | 303/71 |
| 4,223,953 | 9/1980 | Cruse | 303/71 |

FOREIGN PATENT DOCUMENTS

| | | | |
|---|---|---|---|
| 2141725 | 3/1973 | Fed. Rep. of Germany | 303/13 |
| 2032029 | 4/1980 | United Kingdom | 303/13 |

Primary Examiner—Douglas C. Butler
Attorney, Agent, or Firm—Townsend and Townsend

[57] ABSTRACT

An air brake system augments the braking force available while parking without interfering with the operation of the parking brakes. The brake system includes a service brake, a pilot check valve and, typically, a quick release valve. The quick release valve and pilot check valve are interconnected in two alternative ways among the service and spring brake lines and the service brake cylinder. When the spring brake line is pressurized the system acts normally. However, when the pressure on the spring brake line is eliminated the pilot check and quick release valves trap the pressurized air within the service brake. This keeps the service brake for each individual wheel actuated. Pressurizing the service brake line pressurizes the service brake regardless of the condition of the spring brake line. Safety valves can be incorporated in the brake systems to insure that the pressure within the service brake chamber does not exceed a predetermined value.

18 Claims, 7 Drawing Figures

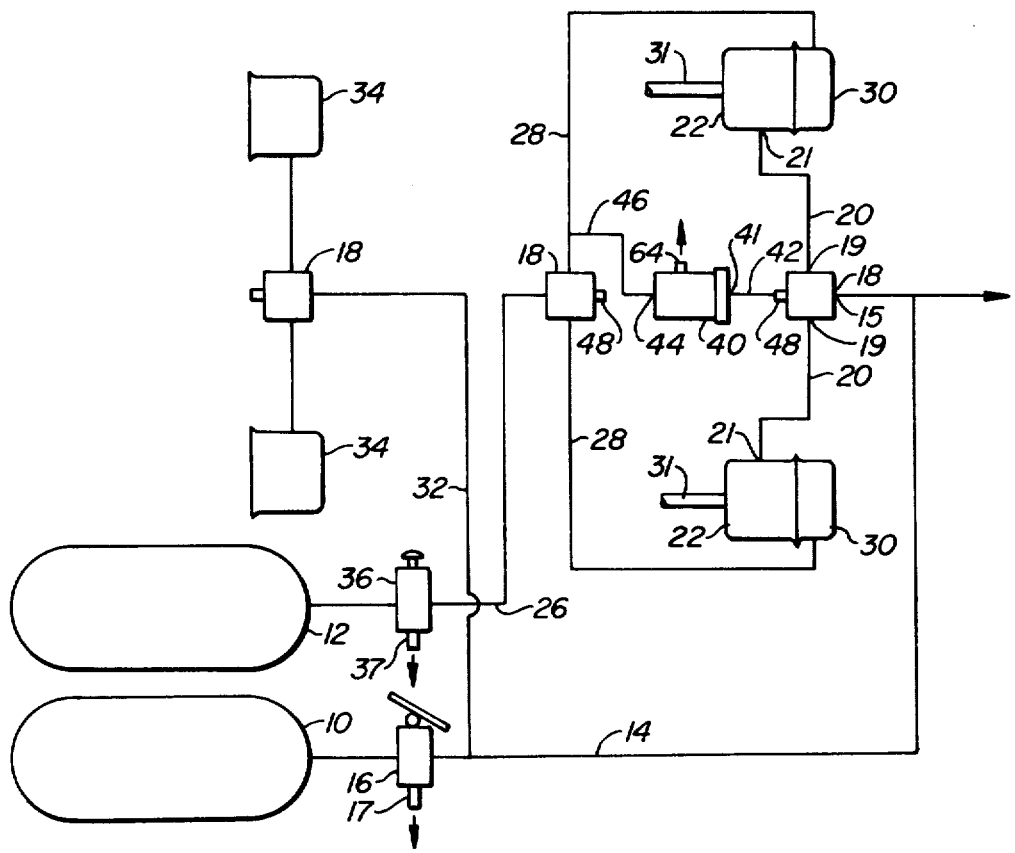
FIG._1.
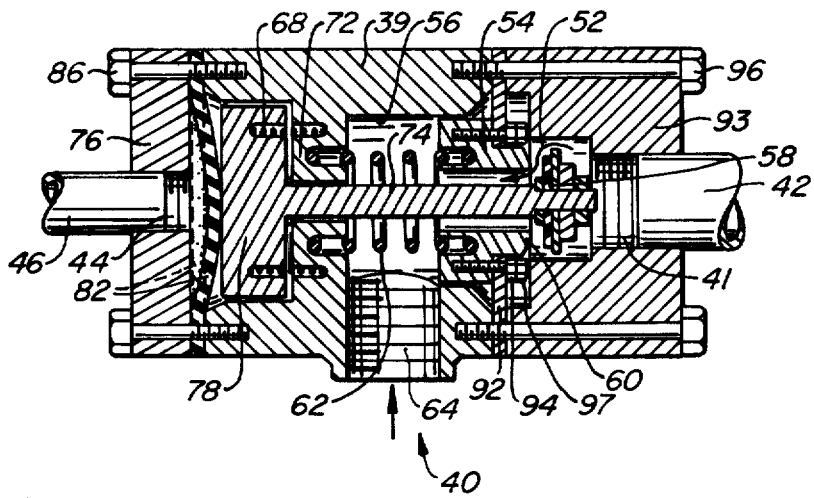
FIG._2A.

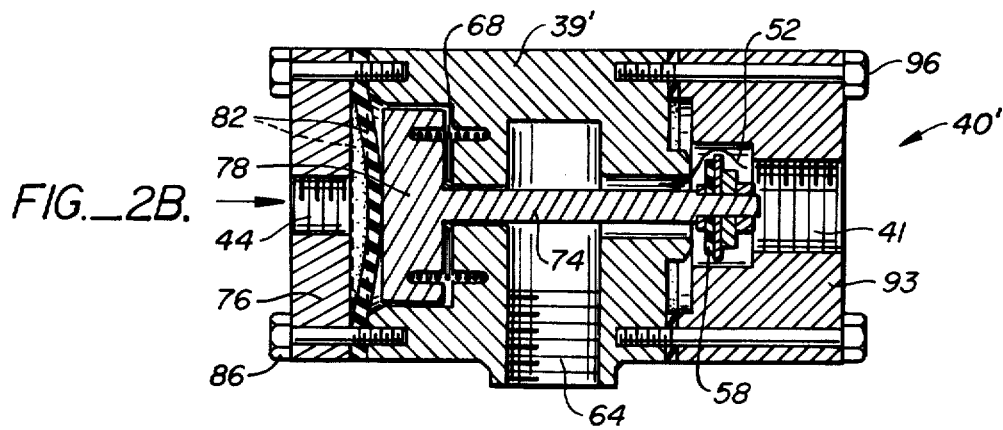
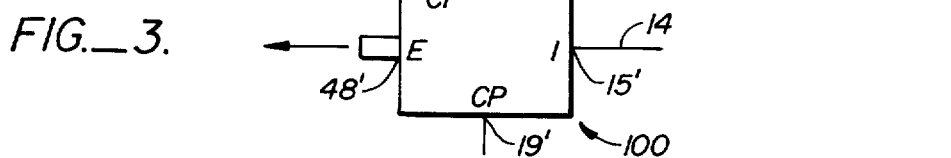
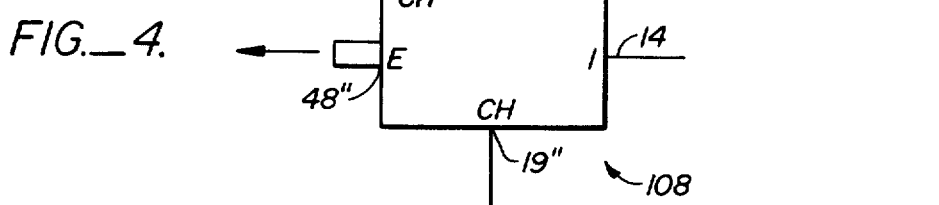
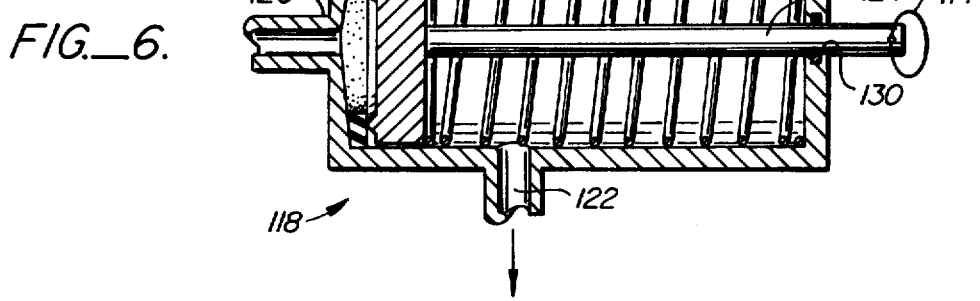

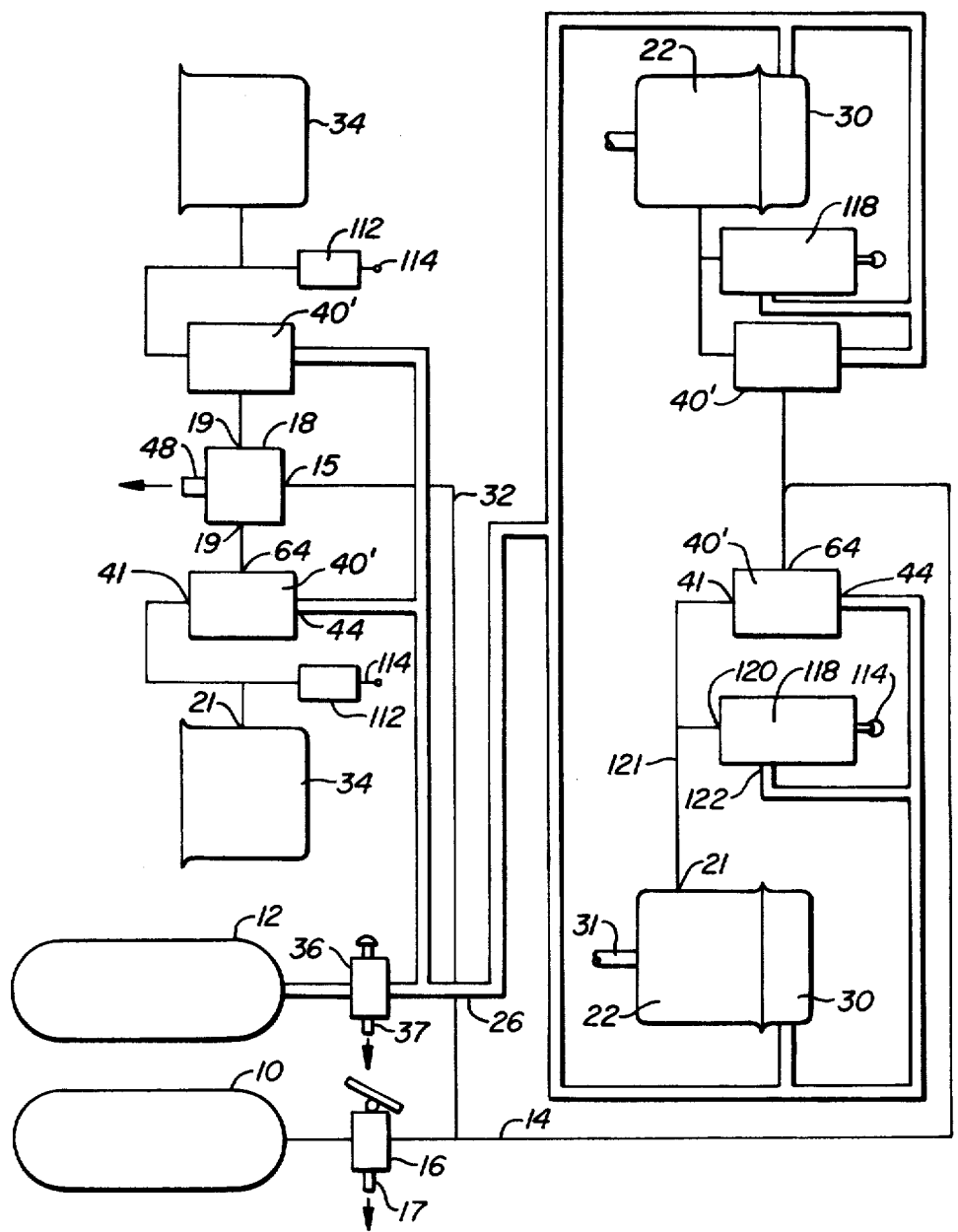
FIG._5.

AIR SERVICE BRAKE EXHAUST CONTROL SYSTEM

This is a continuation-in-part application of U.S. patent application Ser. No. 152,590, filed May 23, 1980, now abandoned, entitled VALVE STRUCTURE.

BACKGROUND OF THE INVENTION

Trucks commonly employ air brakes for stopping both the tractor and the trailer. These braking systems, relying on pressurized air, must include mechanical brakes on the tractor for use while the vehicle is parked. The mechanical brakes are typically spring brakes which normally tend to actuate the same brake shoes, through an actuator rod, as service brake chambers actuate. The spring brakes require application of air pressure to counteract the spring, and thus deactivate the brake, when driving. However, the braking systems found on trucks presently in use vary depending on when they were made and the duty requirements of the brakes. For example, some tractors have combined service and spring brakes on only one out of three axles. Since the force typically exerted by these spring brakes is about one-half of that which can be exerted by the service brake, the maximum braking power of such a tractor while parked is only one-sixth of that available when the vehicle is operating using the service brakes.

Parking brakes for trailers are of two basic kinds. One type, spring parking brakes, normally bias the actuator rod of the brake to a brake applying condition and are released only by applying air pressure to a spring brake chamber. These spring parking brakes used on trailers suffer from the shortcoming discussed above regarding spring brakes on tractors.

Trailers made in the U.S. before 1975 generally do not use spring parking brakes but typically use a relay emergency valve (REV) and an auxiliary tank of pressurized air which combine to maintain air pressure within the service brake chamber when the trailer is parked. The auxiliary tank is pressurized through the relay exhaust valve via a pressurized air supply line. These REV parking brake systems often leak so that after a few hours the braking force is substantially reduced. When the trailer is reconnected to a tractor pressurized air hose connections must be made before they are physically coupled so the auxiliary tank can be pressurized to set the brakes. The loss of pressure can be a safety hazard and increases the time it takes the operator to hook up to a parked trailer.

There have been numerous systems contemplated for using the service brake during emergency stops or parking. However, these prior art attempts have been generally commercially unsuccessful because they either fail to recognize existing legal requirements for braking systems, are too complicated, or are not readily adapted for retrofit to existing truck braking systems.

SUMMARY OF THE INVENTION

An air brake system is disclosed which is particularly adaptable for use with truck air brakes to permit service brake chambers to augment the braking force of separately applied parking brakes without interfering with the operation of the parking brakes. The invention may be used on vehicles having air brakes with very little modification of the existing brake systems required.

In a first embodiment the system includes a service brake, a pilot check valve and a quick release valve. Other valves, such as relay valves or relay emergency valves, incorporate the salient operating characteristics of a quick release valve and can generally be used in lieu of a quick release valve. These latter three valves are all commercially available valves and will generally be referred to in this application by the generic term exhaust valve. The exhaust valves all have what will be termed an exhaust port, an inlet and one or more chamber ports.

In the first embodiment a chamber port of the exhaust valve is connected to the chamber inlet of the service brake and the exhaust port of the exhaust valve is connected to a first port of the pilot check valve. A second port of the pilot check valve is allowed to exhaust to atmosphere. A control port of the pilot check valve is connected to either a spring brake charging line or a pressurized air supply line depending upon what is available on the tractor or trailer. These two lines are hereafter collectively referred to as the spring brake line. An inlet of the exhaust valve is connected to the service brake line. When the spring brake line is pressurized the service brakes operate in their standard manner; that is, the spring brake chamber is pressurized via the spring brake line (which deactivates the spring brakes) and pressurization of the service brake line applies the brakes. When the spring brake line is depressurized, the first port of the pilot check valve is sealed to block flow from the exhaust port of the exhaust valve to trap pressurized air within the service brake to allow the brakes to remain actuated. In both cases pressurizing the service brake line will pressurize the service brake regardless of the condition of the spring brake line.

In a second embodiment the first port of the pilot check valve is connected to the housing inlet of the service brake, the second port of the pilot check valve is connected to a chamber port of the exhaust valve, the control port of the pilot check valve is connected to the spring brake line. An inlet of the exhaust valve is connected to the service brake line. The exhaust port of the exhaust valve opens to the atmosphere. When the spring brake line is pressurized and the brake system acts normally. However, when the pressure on the spring brake line is eliminated, the pilot check valve senses this drop in pressure at its control port and seals its first port thus trapping the pressurized air within the service brake. This keeps the service brake for each wheel activated.

It should be recognized that the functions of the exhaust valve relevant to this invention is performed by the conventional foot pedal valve which is operated by the brake pedal found in all conventional tractors. The term exhaust valve should thus be recognized to include conventional pedal valves. The use of the pedal valve as the exhaust valve of this invention may occur, for example, when the service brakes of a trailer are connected directly to the pedal valve without the use of a valve such as a quick release valve therebetween. Even in such cases the user may desire to add another exhaust valve, such as a quick release valve, to quicken the response of the braking system or for ease of installation.

A primary feature of this invention is the use of the exhaust valve in conjunction with the pilot check valve interconnected with a service brake to allow the service brake chamber to be used to actuate the brake shoes for parking or during emergencies. It should be understood that the present invention in no way alters or interferes with the operation of the parking brakes on the vehicle. It simply augments the amount of braking force which is applied to the brakes of the vehicle. It also does not alter the operation of the service brakes during normal use.

The air brake system of the present invention is useful when used in conjunction with any tractor or trailer presently in use. Virtually all tractors have spring parking brakes and thus a spring brake charging line. All trailers have either a pressurized air supply line, if it does not use spring brakes, or a spring brake charging line, if it uses spring brakes. Thus a source of control pressure is presently available at no additional cost on all tractors and trailers for use with the present invention. Using the braking system of the present invention provides the user, on either a tractor or a trailer, or both, with a highly effective parking and emergency braking system at a cost substantially below the cost of additional spring brake systems. It can, of course, be used on vehicles other than trucks as well.

Trailers which do not incorporate spring brakes in their braking systems generally must be hooked up to the compressed air line of a tractor to set the brakes before the trailer can be moved or the trailer-tractor connection can be made. This time-consuming process is eliminated with the present invention. Further, even if the trailer has spring brakes, the braking force supplied may not be sufficient to insure a safe and reliable hook-up under all circumstances because of the relatively low braking force typically provided by spring brakes alone, especially when, as under the present law, a two-axle trailer is equipped with only one axle containing spring brakes. Thus even in such cases the driver may still be required to hook up the air connections before making the towing connection with the trailer.

Another feature of the invention is the provision of a safety relief valve which protects against applying too much force to the brake actuator rod and thus to the brake shoes. It has been found that when REV type parking brakes are used, if the parking brakes are set while the brake drums are hot, after the brake drums start cooling the drums contract which may raise the effective braking force exerted by the brake shoes against the drums. If the braking force increases when the drums cool and contract, cracked brake drums can result depending upon the extent of this increase. However, the safety relief valve limits the pressure within the service brake chamber to reduce or eliminate this cause of failure. Deformation of drums from the application of too much force on the brake drums while parked is also prevented.

Some air brakes are of the double diaphragm type and include a service brake chamber for road use and a spring brake chamber for parking. Once the pressure on the spring brake chamber is released, thus allowing the springs to bias the brake actuators, any additional force on the brake actuator rods from the service brake chamber will be cumulative with that already supplied by the spring brakes. Thus, when the present invention is used with such brakes, it is necessary to insure that the pressure applied to the service brake chamber is reduced in proportion to the force applied via the spring brake chamber. Typically, the spring brake chamber applies a force equal to about 50 percent of the maximum force which can be applied by the service brake. With the present invention, a safety release valve can be incorporated into the system to limit the pressure in the service brake chamber to a predetermined amount, for example 50 percent of the maximum service brake pressure.

When used with double diaphragm brakes, the position of the safety release valve is chosen to keep from interfering with the normal operation of the service brake. When a safety valve is used with the first embodiment it can be placed between the exhaust port of the exhaust valve and the first port of the pilot check valve. When used with the second embodiment, a modified, double acting safety valve, connected across the output and control ports of the pilot check valve can be used. When used with either embodiment, the safety valve can be an integral part of the pilot check valve.

When the safety valve is an integral part of the pilot check value, it can be used with either embodiment with only one exception. The safety valve cannot be an integral part of a pilot check valve when the trailer uses an REV. This is because an REV constantly exerts full auxiliary tank pressure when parked with parking brakes applied so the safety valve feature could not release any air pressure over the limit pressure. Because the use of spring brakes and the REV are alternative methods of supplying parking braking force to the trailer, this should not be a problem.

Other features and advantages of the present invention will appear from the following description in which the preferred embodiment has been set forth in detail in conjunction with the accompanying drawings.

BRIEF DESCRIPTION OF THE DRAWINGS

FIG. 1 is a schematic view showing a first embodiment of the invention using a quick release valve type of exhaust valve.

FIG. 2A is a longitudinal sectional view of a pilot check valve used with the present invention incorporating a safety relief valve feature.

FIG. 2B is a longitudinal sectional view of the pilot check valve of FIG. 2A without the safety relief valve feature.

FIG. 3 is a schematic view of the connections to a relay valve type of exhaust valve.

FIG. 4 is a schematic view of the connections to a relay emergency valve type of exhaust valve.

FIG. 5 is a schematic view showing a second embodiment of the invention.

FIG. 6 is a simplified cross-sectional view of a safety valve used in the second embodiment of FIG. 5.

DETAILED DESCRIPTION OF THE PREFERRED EMBODIMENTS

In detail, and first with reference to FIG. 1, two tanks of air under pressure are indicated. The service brake air source being indicated at 10 and the spring brake source at 12. In the line 14 from the service brake source is a pedal actuated valve 16 which when opened conducts air through conduit 14 to the inlet 15 of a quick release valve 18 and thence through chamber ports 19 and lines 20 to the chamber inlets 21 of service brake chambers 22. When valve 16 is closed the pressurized air in line 14 is exhausted through exhaust port 17 thus reducing the pressure at inlet 15 of quick release valve 18.

Valve 18 can be of the type in common use in the trucking industry such as that made by Wagner Electric Corporation of St. Louis, Mo., as part No. AC 15793. Quick release valves operate in the following manner. When a pressure of sufficient magnitude is applied to the inlet, a fluid path between the inlet and the chamber ports is opened and at the same time closing the exhaust port. This allows the pressurization of brake chamber 22. When the pressure at the inlet is removed, such as when the driver removes his foot pressure on his foot brake valve or hand pressure on his trailer hand brake valve, both inlets become sealed and paths between the chamber ports and the exhaust port 48 of the quick release valve 18 are opened allowing the air within brake chambers 22 to exhaust quickly.

Line 26 from the spring brake source conducts air to another quick release valve 18 from which air is conducted through lines 28 to spring brake air chambers 30. Both chambers 22 and 30 act on the actuator rods 31 which operate the brake shoes, not shown. Line 14 also feeds line 32 which conducts air to the service brake chambers 34 of the front axle which does not include spring brake chambers.

The above described structure is conventional and is widely employed in present air brake systems. The spring brake chambers 30 are employed to oppose a spring (not shown) which, at all times, urges the brakes to brake applying condition. This spring is normally opposed by the pressure in chambers 30 and such pressure is not released until a valve 36 in line 26 is actuated by the operator. The air chambers 22 are supplied with air under pressure under normal running conditions when the pedal actuated valve 16 is opened by the operator.

By the present invention the two above described systems are connected by a pilot check valve 40, details of which are shown in FIG. 2A. A first port 41 of valve 40 is connected by line 42 to the normal exhaust port 48 of the quick release valve 18 which is connected to the service brake chambers 22 via chamber ports 19. At its opposite end valve 40 is provided with a control port 44 which is connected by means of a line 46 with one of the lines 28 which supply the air chambers 30.

At this point, it should be noted that the right hand quick release valve 18 permits exhausting of the chambers 22 through exhaust port 48 when the pedal operated valve 16 is released by the operator. These three valves all have what will be termed an exhaust port, an inlet and one or more chamber ports.

Referring now to FIG. 2A, it will be seen that said line 42 conducts the exhaust from the adjacent quick release valve 18 through first port 41 along a path 52 and through a sleeve 54 which in turn is slidably mounted in a central bore 56 formed centrally of a body 39 of valve 40. Such exhaust is conducted along path 52 between a normally open sealing washer 58 which is adapted to cooperate with a valve seat 60 formed at one end of said sleeve 54. The exhaust is then conducted past spring 62 and out a second port 64.

At this point it will be seen that the normally open valve element 58, which is opened as a result of the pressure in line 46, permits the quick release valve 18 in lines 20 to operate in a normal manner except that instead of being exhausted directly to the atmosphere, the air from chambers 22 is exhausted through valve 40.

Sealing washer 58 is urged at all times toward seat 60 by compression spring 68 which is interposed between an enlarged head 78 of a push rod 74 and a central portion 72 of body 39 of valve 40. Washer 58 is normally held off seat 60 to permit the above mentioned exhaust operation by means of push rod 74 which is slidably mounted within portion 72. Compression spring 68 urges the push rod 74 to the left as seen in FIG. 2A, but the force of spring 68 is normally overcome by a pressure responsive diaphragm 82 secured between a cap 76 and body 39 by bolts 86.

The control port 44 is formed in cap 76 and is connected to line 46 which in turn is connected, as best seen in FIG. 1, to lines 28 which are normally under the pressure which is applied to chamber 30.

From FIG. 2A it will be apparent that as long as air pressure is applied to chambers 30 and diaphragm 82, push rod 74 holds washer 58 off seat 60 and thus permits the normal exhausting of service brake chambers 22. However, when valve 36 (FIG. 1) is opened by the operator lines 28 are, of course, exhausted to atmosphere, via exhaust port 48, so that spring 68 pushes diaphragm 82 to at least the dotted line position of FIG. 2A, thus permitting push rod 74 to move to the left and permitting washer 58 to seat under the urgency of spring 68.

When washer 58 closes the valves two functions are performed: first, air pressure is released from chambers 30 permitting the spring therein to apply the brakes with the force of said springs; second, the lines 20 are not permitted to exhaust because of the closing of washer 58 and whatever pressure is applied to service brake chambers 22 by valve 16 remains on the brakes. In this manner, the braking forces attributable to the service brakes and to the spring brakes are combined to provide a much higher braking force than is normally provided by the service brake.

When the air brake system of the present invention is used on air brakes which have both service brake and spring brake chambers, there is a possibility that if both brake chambers simultaneously actuate rod 31, excessive force may be applied to the brakes via actuator rod 31. To prevent this occurrence, a safety valve can be used which will limit the pressure which can be stored in the service brake chamber. Valve 40 incorporates a safety valve feature in its structure to help solve this problem. Sleeve 54 is normally urged to the position of FIG. 2A by spring 62 which is shown in its fully extended condition. In addition, a resilient ring spring 92 is secured at its outer periphery between body 39 and an inlet body 93 by bolts 96 and is secured at its inner periphery between a ring 94 and sleeve 54 by bolts 97. By this structure movement of sleeve 54 to the left against the urgency of springs 62 will occur when the pressure in line 42 exceeds a predetermined amount set by the force of spring 62. Upon movement of sleeve 54 to the left, with push rod 74 now stopped by diaphragm 82 and the end wall, washer 58 is lifted off seat 60 permitting exhaust through exhaust port 64, thus lowering the pressure in the service brake chambers 22 to a predetermined pressure corresponding to the design pressure of the service brake system.

Referring now to FIGS. 3 and 4, alternative valves which can be used in lieu of quick release valve 18 are shown. In FIG. 3 a relay valve 100, such as that made by Bendix Westinghouse Limited, Kingswood, Bristol, England and sold as Relay Valve R-6 is shown. Valve 100, like valve 18, includes an inlet 15', an exhaust port 48' and a pair of chamber ports 19'. Valve 100 acts in much the same manner as valve 18 but includes a port 102 connected to a tank 104. While the quick exhaust valve speeds the release of the service brakes, the relay valve does that but also speeds the application of the service brakes because upon application of pressure to service line 14 air is supplied to the service brakes through the chamber ports from tank 104 rather than having to pass through lengthy runs of service line 14.

Shown in FIG. 4 is a relay emergency valve 108 which can be used in lieu of quick release valve 18 or relay valve 100. Relay emergency valves are well known and may be one such as made by Bendix Westinghouse Limited, Kingwood, Bristol, England, sold as Relay Emergency Valve R.E.6. It operates, insofar as the present invention is concerned, similarly to relay valve 100. However, when the pressure in spring brake line 28 drops to a low value, valve 108 automatically connects the pressurized air in tank 104 to the chamber ports 19''. Therefore relay emergency valves are generally never used on trailers having dual spring and service brakes.

Turning now to FIG. 5, a second embodiment of the present invention is shown. Like numbers refer to like elements shown in the embodiment of FIG. 1. Valve 40', shown in FIG. 2B, is similar to valve 40 however the elements of valve 40 which make up the safety valve feature are either modified or absent. In particular, sleeve 54 of valve 40 becomes an integral part of body 39' in valve 40' and spring 62 is eliminated. External safety valves, described in more detail below, can be used, if desired, with valve 40' in lieu of the safety valve feature of valve 40. It should be understood that either valve 40 or valve 40' can be used with either of the two embodiments shown in FIGS. 1 and 5.

The primary difference between the first embodiment of FIG. 1 and the second embodiment of FIG. 5 is that chamber ports 19 of quick release valve 18 in FIG. 1 are connected directly to chamber inlets 21 of service brake chambers 22 while in the second embodiment, shown in FIG. 5, first ports 41 of pilot check valves 40' are connected to chamber inlets 21. Control ports 44 of valves 40' are connected to spring brake line 26 while second ports 64 are connected to chamber ports 19 of quick release valves 18.

In use, when spring brake line 26 is pressurized, fluid flowing through valve 40' is relatively unimpeded in either direction between first port 41 and second port 64. However, when fluid pressure in line 26 is reduced sufficiently so that element 58 seats against surface 60, flow from first port 41 to second port 64 is blocked. Thus, this condition, which usually occurs when the operator has actuated valve 36 exhausting air through an exhaust port 37 of valve 36, permits the springs in the spring brake cylinders 30 to expand to activate rods 31. Any compressed air within chambers 22 or 34 becomes trapped within the service brake chamber so that the actuator rods remain actuated by both the service and spring brake chambers.

To keep the service brake chambers shown on the left-hand side of FIG. 5 from applying too great a force to the brakes, which can occur if the brakes are set when the brake drums are hot and the brakes are left to cool, safety valves 112 can be used. The safety valves are of standard construction and are typically either connected to the conduit connecting chamber inlets 21 and first ports 41 as shown at the left-hand side of FIG. 5 or connected directly to service brake chamber 34, not shown. Safety valve 112 may be set to 100% of the maximum service brake pressure so that if pressures in excess of that are developed within service brake chambers 34, such excess can be vented to the atmosphere via safety valve 112.

A pull ring 114 may be provided to allow the user to manually dump the pressurized air from within chamber 34. This manual dump feature allows the service brake chambers to be depressurized without having to first hook the trailer to a tractor, or some other source of pressure, to pressurize the spring brake line. This allows the brakes on wheels not having spring brakes to be deactivated.

When dual brake chambers are used for a parking brake combination, such as shown at the right hand side of FIG. 5 with the combination of a service brake chamber 22 and a spring brake chamber 30, the use of safety valve arrangement such as valve 112, would not work. Assuming the spring brake chamber 30 supplies 50% of the maximum service brake force to actuator rod 31, a maximum pressure within service brake chamber 22 for parking brakes should be about 50% of the maximum service brake pressure. However, if one were to mount a safety valve 112 between chamber inlet 21 and first port 41, the safety valve would constantly dump much of the air pressure resulting from service braking operations. That, of course, would be unacceptable. Thus, either a pilot check valve incorporating the safety valve feature of valve 40 can be used or a safety valve 118, shown in FIG. 6, can be used in conjunction with valve 40'.

Valve 118 includes ports 120 and 122, a piston 126 connected to a shaft 124, and a spring 128. Shaft 124 extends through a sealed sleeve 130 and has a pull ring 114 connected to its outer end. Spring 128 keeps piston 126 biased to the left as shown in FIG. 6 against a gasket 132 so that port 120, connected to a line 121 connecting first port 41 with chamber inlet 21, is sealed from port 122. Spring 128 and piston 126 are sized so that when spring brake line 26, connected to port 122, is pressurized, the force of such pressure in conjunction with the spring force keep piston 126 to the left to seal port 120. When no pressure is applied through line 26, so that the spring brakes are applied, pressure applied at port 120 will move the piston to the right sufficiently far so that pressurized air can pass through port 120, out port 122 into line 26 and out exhaust port 37. As air within service brake chamber 12 passes out of port 122, the pressure in line 121 drops so that spring 128 moves piston 126 to the left to seal port 120. By appropriate sizing of the component parts of valve 118, the maximum pressure within service brake chamber 22 can be controlled without having any negative effect upon the normal operation of the service brake. Air within line 121 and service brake chamber 22 can also be manually vented by pulling on ring 114.

Drivers sometimes activate their parking brakes concurrently with their service brakes, such as when driving down a long grade and when parking. This compounding of the braking forces significantly overstresses the brakes because the component parts of the brakes are only designed for normal service brake application pressures. Compounding thus tends to cause premature failure of many brake components and should be avoided. However, when safety valve 118 is used, as shown in FIG. 5, valve 118 automatically eliminates any possibility of undesirable compounding of the braking forces by the driver. Wherever line 26 is vented to apply the spring brakes, the pressure in line 121 and therefore in service brake chamber 22 is limited by valve 118. This automatic anti-compounding feature is also available with the first embodiment. In such case port 120 would be connected to line 20 and port 122 would be connected to line 28 to automatically prevent compounding of the braking forces.

It is generally economically advantageous to use standard components whenever possible. For example, by replacing the spring found in a conventional ball check valve with a much heavier one, the resulting modified valve can be used in lieu of safety valve 118. By also inserting a conventional manually actuated relief valve along line 121, the functions of valve 118 are duplicated using only slightly modified standard components.

It should be noted that no quick release valve 18 is used in the brake system at the right-hand side of FIG. 5. Rather foot valve 16 performs the same functions as valve 18 by either supplying line 14 with pressurized air when actuated or exhausting the pressurized air in line 14 to atmosphere through exhaust port 17.

It will be understood that should valves 40 or 40' be employed in a hydraulic system having a liquid medium certain slight modifications, such as the addition of various seals, may be required. Another feature of the above described arrangements is that when a plurality of wheels and their brake systems are involved, the failure of a brake system of one wheel has no effect on the operation of the remaining wheels and their brakes. If desired, by using fewer components axle by axle protection can be achieved rather than wheel by wheel protection.

Modification and variation can be made to the disclosed embodiments without departing from the subject of the invention as defined in the following claims.

What is claimed is:

1. An air service brake exhaust control system adapted for controlling the exhaust of air from an air service brake assembly, the assembly including a housing, a service chamber defined by said housing, a housing inlet formed in said housing and fluidly communicating with the service chamber, and an actuator responsive to the pressure within said service chamber, the system comprising:
    exhaust valve means, having an exhaust port, for fluidly connecting said housing inlet to a service brake pressure source or to said exhaust port for discharge to atmosphere; and
    a pilot check valve having a first port fluidly coupled to said exhaust port, a second/exhaust port fluidly coupled to said first port, check valve means for blocking fluid flow from said fluid port to said second/exhaust port, a control port, and means, responsive to the presence of a control pressure at said control port of at least a first value, for overriding said check valve means to allow relatively free flow of fluid from said first port to said second-/exhaust port;
    whereby when said control pressure is at least said first valve and said housing inlet is fluidly connected to the service brake pressure source, fluid from said service brake pressure source is fluidly connected to said service chamber to actuate said actuator; when said control pressure is at least said first value and said housing inlet is fluidly connected to said exhaust port, said housing inlet is fluidly connected to said second/exhaust port to allow the fluid in said service chamber to be exhausted through said second/exhaust port; and when said control pressure is less than said first value, fluid flow from said housing inlet through said exhaust port and to said first port of said pilot check valve is blocked by said check valve means so the pressure within said service chamber is not dissipated by exhausting fluid within said service chamber through the second/exhaust port.

2. The air brake system of claim 1 wherein said exhaust valve means includes a quick release valve.

3. The air brake system of claim 1 wherein said exhaust valve means includes a relay valve.

4. The air brake system of claim 1 wherein said exhaust valve means includes a relay emergency valve.

5. The air brake system of claim 1 wherein said control port is fluidly connected to a spring brake line.

6. The air brake system of claim 5 further comprising a spring brake chamber assembly means for normally biasing said actuator and for overriding the biasing of said actuator when said spring brake chamber is pressurized.

7. The air brake system of claim 1 further comprising safety valve means for limiting the pressure in said service chamber to a second value.

8. The air brake system of claim 7 wherein said pilot check valve includes said safety valve means, said safety valve means including means for providing a reverse fluid pathway between said first port and said second-/exhaust port when the first port pressure exceeds the second/exhaust port pressure by a chosen value thereby preventing overpressure in said service chamber.

9. An air service brake exhaust control system for controlling the exhaust air from an air service brake assembly, the assembly including a housing, a service chamber defined by said housing, a housing inlet formed in said housing and a fluidly communicating with said service chamber, and an actuator responsive to the pressure within said service chamber, the system comprising:
    a pilot check valve having a first port fluidly coupled to said housing inlet, a second port fluidly fluidly copled to said first port, check valve means for allowing relatively free fluid flow from said second port to said first port and for blocking fluid flow from said first port to said second port, a control port, and means, responsive to the presence of a control pressure at said control port of at least a first value, for overriding said check valve means to allow relatively free flow of fluid between said first and second ports; and
    exhaust valve means, having an ambient exhaust port, for fluidly connecting said second port to a service brake pressure source or to said ambient exhaust port;
    whereby when said control pressure is at least said first value and said second port is fluidly connected to the service brake pressure source, the fluid from said service brake pressure source is fluidly connected to said housing inlet to actuate said actuator; when said control pressure is at least said first value and said second port is fluidly connected to said ambient exhaust port, said housing inlet is fluidly connected to said ambient exhaust port to allow the fluid in said service chamber to be exhausted through said ambient exhaust port; and when said control pressure is less than said first value, fluid flow from said service chamber through said pilot check valve is blocked by said check valve means so the pressure within said service chamber is not dissipated by exhausting fluid within said service chamber through said ambient exhaust port.

10. The air brake system of claim 9 wherein said exhaust valve means includes a quick release valve.

11. The air brake system of claim 9 wherein said exhaust valve means includes a relay valve.

12. The air brake system of claim 9 wherein said exhaust valve means includes a relay emergency valve.

13. The air brake system of claim 9 wherein said exhaust valve means includes a foot pedal valve.

14. The air brake system of claim 9 wherein said control port is fluidly connected to a spring brake line.

15. The air brake system of claim 14 further comprising a spring brake chamber assembly means for normally biasing said actuator and for overriding the biasing of said actuator when said spring brake chamber is pressurized.

16. The air brake system of claim 15 further comprising a safety valve means, having a one port fluidly connected to said service chamber and another port fluidly connected to said spring brake line, for limiting the pressure in said service chamber to one value when said control pressure is at least said first value and for limiting the pressure in said service chamber to another, lower value when said control pressure is less than a third value, said third value being substantially less than said first value.

17. The air brake system of claim 9 further comprising safety valve means for limiting the pressure in said service chamber to a second value.

18. The air brake system of claim 17 wherein said safety valve means includes a pressure relief valve fluidly connected to a conduit connecting said housing inlet and said first port.

* * * * *